May 15, 1923.
E. L. HODGE
AUTOMOBILE TIRE
Filed May 12, 1922
1,455,615
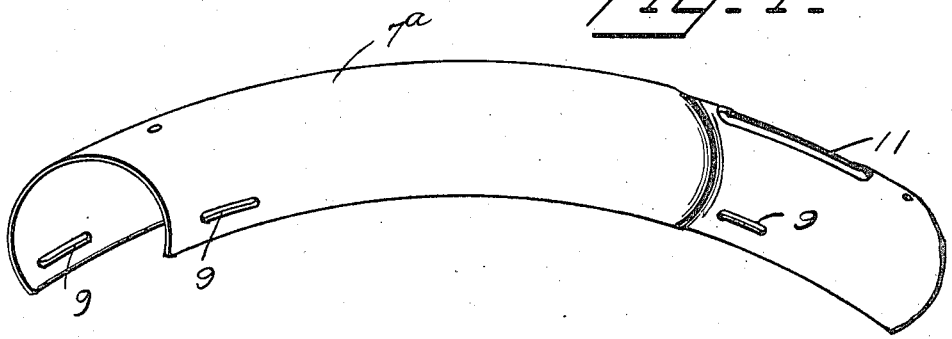
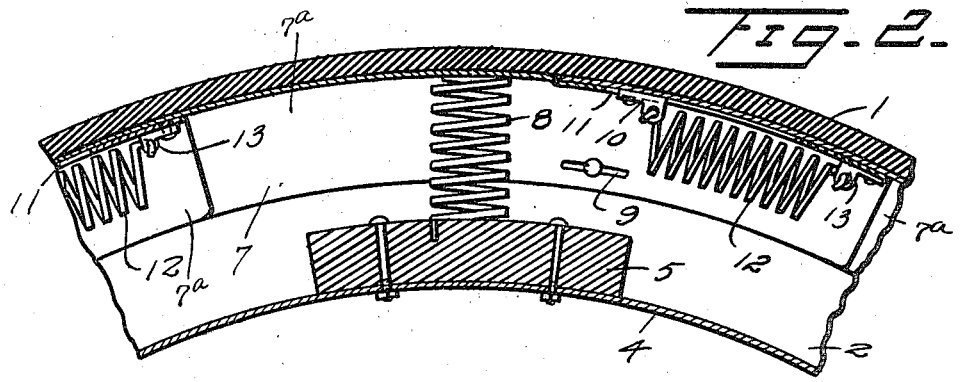
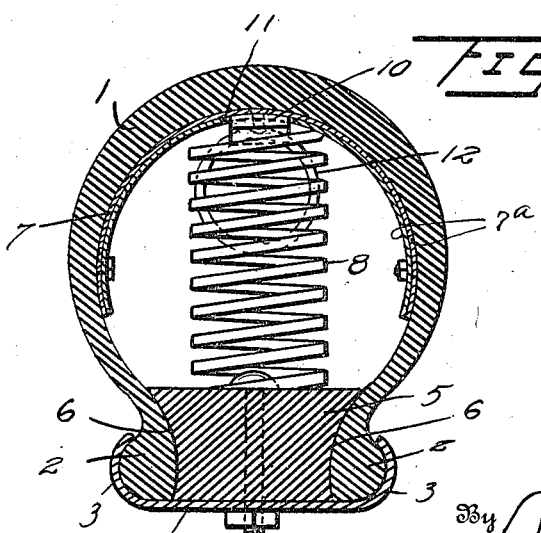
Inventor
E. L. Hodge Patented May 15, 1923.

1,455,615

UNITED STATES PATENT OFFICE.

EUGENE L. HODGE, OF FAR ROCKAWAY, NEW YORK.

AUTOMOBILE TIRE.

Application filed May 12, 1922. Serial No. 560,327.

*To all whom it may concern:*

Be it known that I, EUGENE L. HODGE, a citizen of the United States, residing at Far Rockaway, in the county of Queens and State of New York, have invented certain new and useful Improvements in Automobile Tires; and I do hereby declare the following to be a full, clear, and exact description of the invention, such as will enable others skilled in the art to which it appertains to make and use the same.

This invention relates to new and useful improvements in automobile tires and has for its primary object the provision of a cushioned structure adapted to fit in and support an ordinary shoe to provide the same with the desired resiliency now obtained from a pneumatic inner tube without the annoyance and expense attached to the use of the latter.

Another object of this invention is the provision of an automobile tire of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a fragmentary perspective view illustrating a shell section of a cushion structure for a tire constructed in accordance with my invention, Figure 2 is a longitudinal sectional view illustrating the same mounted in a tire, Figure 3 is a transverse sectional view illustrating the same.

Referring in detail to the drawings, the numeral 1 indicates a shoe of any well known construction provided with the usual beads 2 to engage the flanges 3 of a rim 4 and the latter has securing blocks 5 secured to its outer face and which extend into the shoe 1 and are provided with concave sides 6 to receive and fit the inner curved walls of the bead portions of the shoe for the purpose of retaining the beads in engagement with the flanges of the rim.

A resilient shell 7 constructed from sections $7^a$ of spring steel or aluminum or any other material suitable for the purpose is located in the shoe 1 and each section overlaps the ends of adjacent sections, that is one end of each section is slightly reduced and fitted within the large end of the adjacent section. Radially extending coil springs 8 bear against the shell and the blocks for the purpose of cushioningly supporting the shell in engagement with the wall of the shoe. A spring 8 and block 5 are provided for each section $7^a$. Each section $7^a$ at its ends is provided with elongated slots 9 arranged so that the slots of one of the ends aline with the slots of the other end of the section and receive bolts for the purpose of slidably connecting the ends of the sections together. A spring fastener or lug 10 is secured to the inner wall of each section adjacent one end and projects through a slot 11 formed in the adjacent end of the adjacent section and has connection with an expansion spring 12 which is in turn secured to a lug 13 secured to the end named of the shell section last named. The action of the spring 12 is to separate the ends of the shell sections to cause the shell to press tightly against the wall of the shoe 1 for the purpose of supporting the same and permitting the latter to have the desired resiliency. A device constructed in accordance with the foregoing and as shown in the drawings will support the shoe 1 in a manner similar to the ordinary pneumatic inner tube now employed without the disadvantages and annoyances of a pneumatic inner tube by having a cushioned tire which is not subject to puncture or blowout. It should be apparent that a device constructed in accordance with the foregoing will provide the desired resiliency to a shoe, consequently affording comfortable riding to an automobile equipped with the same, and will not be subject to puncture and blowout.

While I have shown and described the preferred embodiment of my invention it will be understood that minor changes in construction, combination and arrangement of parts may be made without departing from the spirit and scope of the invention as claimed.

Having thus described my invention what I claim is:

1. A cushioning shell for tire casings including arcuate sections having reduced end portions and slots therethrough, the larger portions of the sections adapted to overlap said reduced portions and having lugs depending therefrom through the slots, springs connected to said lugs and to adjacent sections by other lugs, said sections having additional elongated slots, fastenings on the sections extending through the second mentioned slots, blocks one for each section adapted to engage a rim and be embraced by the beads of the tire casing, and springs interposed between and supported by said blocks and said sections.

2. A cushioning shell for tire casings including arcuate sections overlapping each other at the end portions thereof, blocks to engage a rim and to be engaged by the beads of the tire casing, said blocks having concaved sides to accommodate the beads of the casing, said blocks constituting supports, and springs on said blocks and in engagement with said sections.

In testimony whereof I affix my signature in presence of two witnesses.

EUGENE L. HODGE.

Witnesses:
JOHN J. GALLAGHER,
JOHN F. DIENER.